Nov. 11, 1941.  G. J. OLNEY  2,262,465
VEGETABLE SEPARATOR
Filed May 1, 1939  2 Sheets-Sheet 1
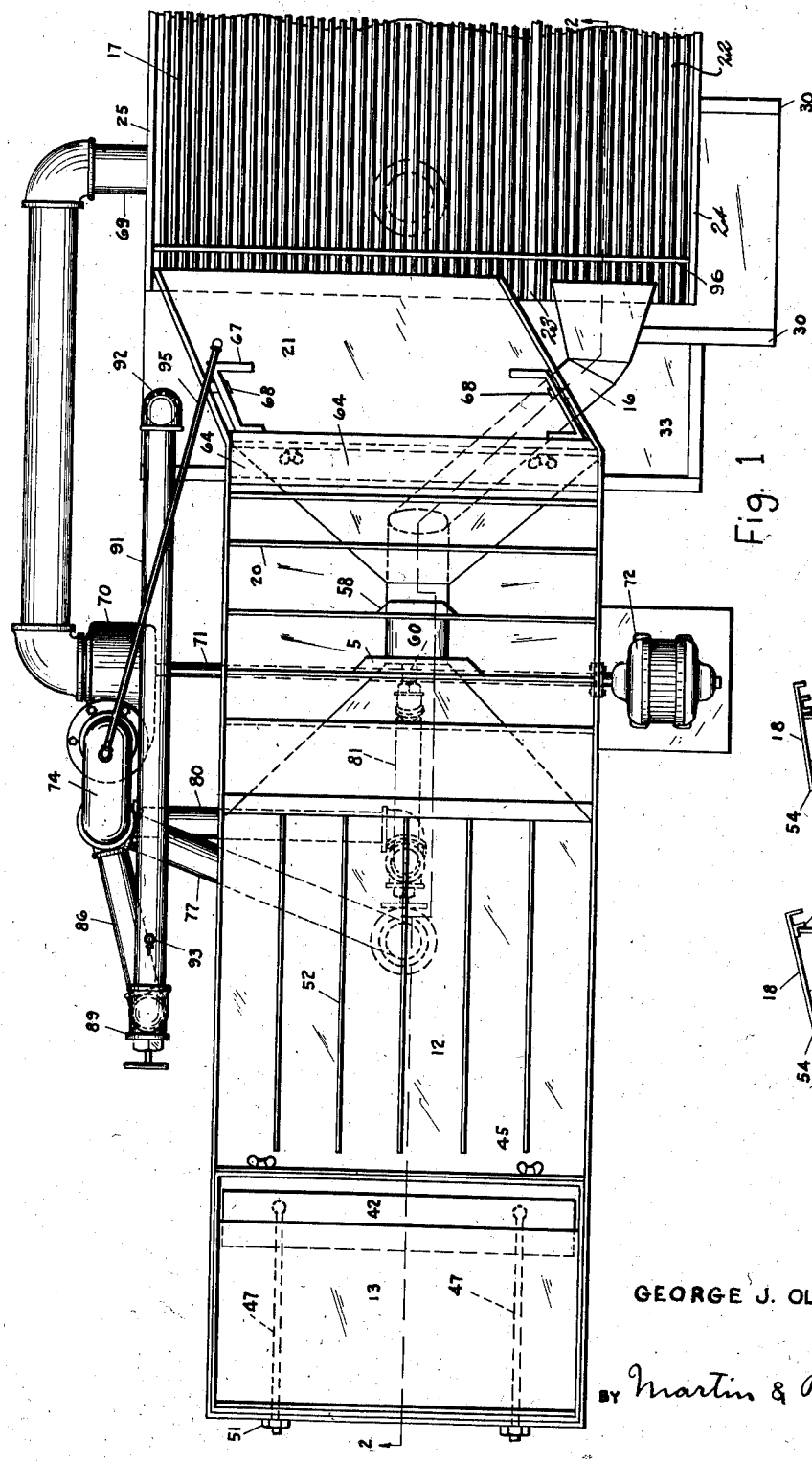
INVENTOR
GEORGE J. OLNEY
BY Martin & Rendell
ATTORNEYS

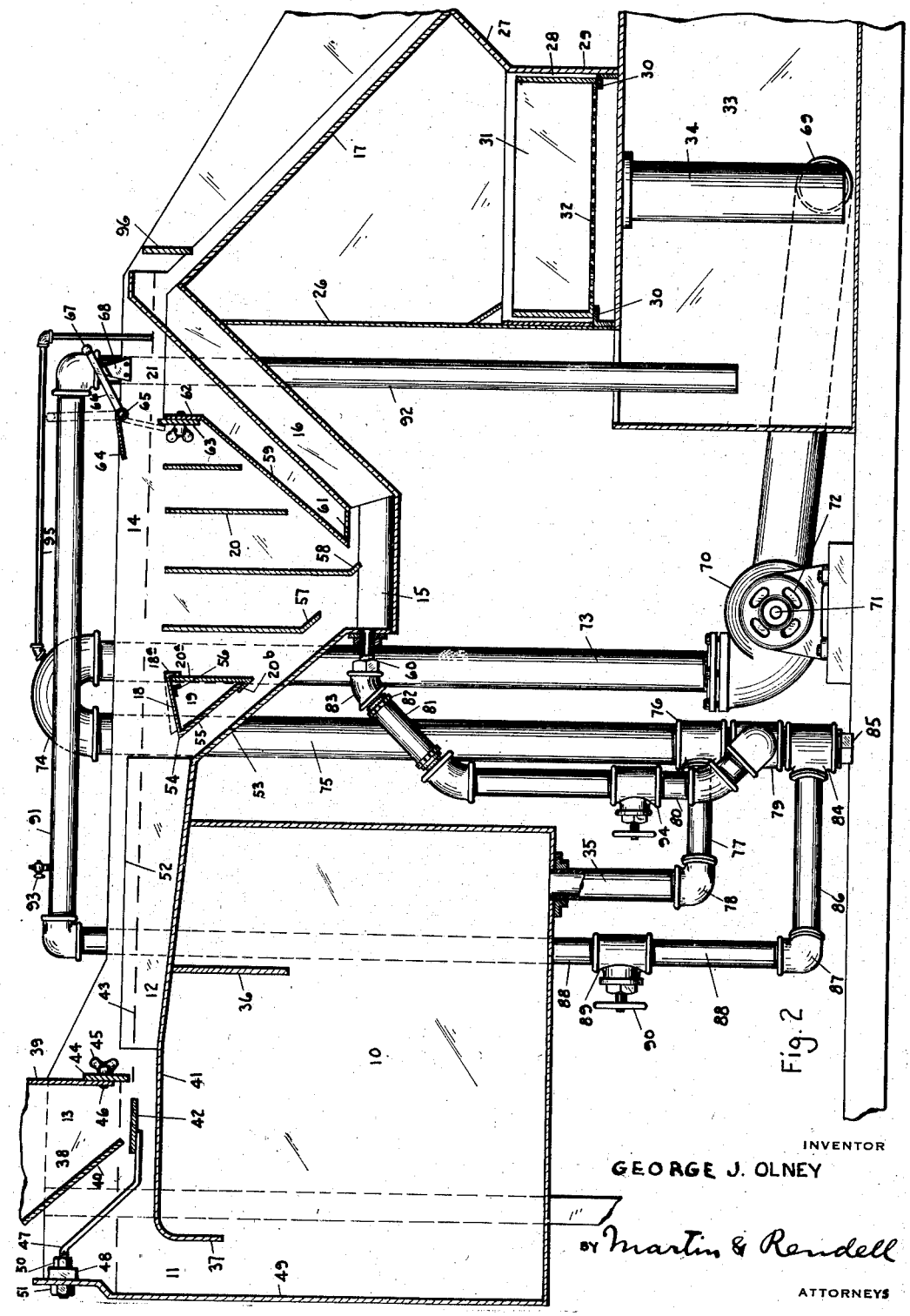

Patented Nov. 11, 1941

2,262,465

UNITED STATES PATENT OFFICE 2,262,465

VEGETABLE SEPARATOR

George J. Olney, Westernville, N. Y.

Application May 1, 1939, Serial No. 271,005

9 Claims. (Cl. 209—173)

This invention relates to a vegetable separator including thereby a grader and a cleaner wherein a liquid, either plain water or brine or its equivalent, is used to float and separate the vegetables on the basis of the difference in gravity between the vegetables or part of them, the trash, and the liquid.

The purpose of this invention is to provide a new and improved vegetable separator of the class indicated and one which is of wide adaptability, easy to construct and efficient in operation and not liable to get out of order, and which will use less power.

A further purpose is to provide a separator of the class indicated that has advantages and refinements in the operation of the whole machine, and further to provide improvements in several separate parts of the machine such as a new and improved feeding mechanism, a novel and advantageous adjustable wedge divider located in the early part of the main separating tank.

A further purpose is to provide a movable gate which when the machine is to be stopped may be placed across the passage or current carrying the lighter vegetables so as to stop the flow at that transverse point and thus raise the level of the liquid in the machine and cause the hesitating heavier material to be quickly forced out through the passageway leading from the lower part of the main separating tank.

A further purpose is to provide means for under various circumstances regulating the flow at the different parts of the machine and thereby effecting and hastening an effective separation.

Fig. 1 is a plan view of a separating machine embodying this invention.

Fig. 2 is a vertical longitudinal sectional view mostly on line 2—2 of Fig. 1.

Fig. 3 is a side elevation of the wedge-shaped divider and its supporting baffle plate shown in Fig. 2 but adjusted to have its thin edge higher.

Fig. 4 is a similar view of a modified form of divider showing a third possible adjustment.

Referring to the drawings in a more detailed description it will be seen that this machine in general includes a main liquid supply tank 10 and outlet 11 from the upper part thereof supplying the liquid to the upper or left hand end of an inclined passageway 12 as the parts are shown in the drawings, a hopper 13 having its lower part projecting down into and delivering the vegetables to be separated into the said passageway slightly down-stream from the outlet 11, a main separating tank 14 connected to the lower end of the passageway 12, said main separating tank slanting downwardly at both sides and from the front or right hand side and its rear or the left hand side together the heavier vegetables into a semi-circular trough 15 well below the top of said main tank and from which trough portion the heavier vegetables are carried upwardly through a tube 16 to deliver the said heavier vegetables and the water or brine accompanying the same to the near portion of a slanted screen 17. The lighter vegetables remain at the top of the liquid in the main settling tank 14 and pass to the right or forwardly in said tank first over the upper face 18 of the wedge-shaped divider 19 and then over the upper end of a series of vertically arranged baffle plates 20 and then over the substantially horizontally bottomed channel 21 which as plainly seen in Fig. 1 as a whole slants diagonally further from the observer or away from the upwardly slanting tube 16 so as to deliver the said lighter vegetables and its accompanying water to the further and larger portion of the screen 17 as seen in Fig. 1. The screen 17 is of the conventional type of slats or rods 22 leaving the desired size of spaces therebetween suitable for allowing the water or brine to drain through said rods or slats 22 while the said vegetables roll or slide downwardly on the said inclined rods 22 and the lighter and usually better class of vegetables from the further portion of the screen 17 are delivered to one container or chute in conventional manner while from the nearer portion of the screen as seen in Fig. 1 the heavier vegetables slide down the rods of the said screen 17 into separate receptacles or a delivery chute (not shown) in a manner well known in the art.

The near portion of the screen is divided from the further portion by an upstanding partition 23 and on the near edge of the near portion of the screen is provided an upstanding guard 24 and at the further side of the larger and further portion of the screen is provided a similar upstanding guard 25 to keep the vegetables from going sidewise from the screen. Below and to the left of the screen 17 as seen in Fig. 2 there is provided an upstanding imperforate partition 26 and spaced well to the right therefrom or forward of the machine as this machine is illustrated there is provided a slanting imperforate plate 27. The partition 26 and the slanting plate 27 operate to direct the water or brine from the screen 17 downwardly into a vertical-walled channel 28 formed on the left by the lower part of the partition 26 and upon the right by a vertical plate 29 having its upper end connected to the plate 27. In this channel is supported as on ledges 30 one or more baskets 31 having bottoms 32 provided with fine perforations. These baskets retain any fine matter that has come through with the peas and come through the screen but allow the water or brine to pass downwardly through the bottom of the baskets into the bottom of the channel 28 from which it is collected and passes downwardly through pipe 34 into the liquid receiving tank 33. The pipe 34 extends well toward the bottom of the large tank 33 and delivers the oncoming liquid into the bottom of the liquid already in the tank and thus prevents or greatly reduces foaming by the liquid. From this main liquid-collecting tank the liquid is taken by a pump and pipes hereinafter described and ultimately delivered into the liquid supply tank 10 through pipe 35 connected to the lower end of said tank and at its forward side.

The liquid is supplied to the tank 10 as mentioned through pipe 35 under moderate pressure so as to keep this tank full and constantly force a gentle current therefrom to rise from the tank through the outlet 11 into the open-topped passageway 12 at its left hand or upper end as the machine is illustrated in the drawings herein. Preferably a downwardly hanging partition 36 is provided a little to the front of the middle of the upper part of this liquid supply tank so as to force a more devious and gentle current through the supply tank to its outlet 11. For a similar purpose to the front side of the outlet is provided a depending flange or partition 37 which overcomes any front to rear current at this portion of the machine and causes a gentle upward movement of the liquid into the upper end of the passageway 12.

The hopper 13 is open-topped and open-bottomed but has two opposite sides 38 connected by a front vertical side 39 and a rear side 40 slanting forwardly as it extends downwardly. The bottom 41 of the passageway 12 forms the top of the main supply tank 10 and in practice begins to slope appreciably slightly forward of the hopper 13 which in turn has its lower end slightly to the right or downstream from the upper or left hand end of the said bottom 41, the left hand extremity of which is as appears in Fig. 2 spaced a proper distance from the left hand wall of the liquid supply tank 10 so as to thereby form the outlet 11 from the said tank to the passageway 12. The hopper 13 extends for the full width of the passageway 12 and the vegetables in a more or less dry state that are put into the open top of the hopper descend in the hopper and pass into the passageway 12 through the open-bottomed end of the hopper. The hopper 13, however, has its lower end or at least the transverse lower edges of its front side 39 and rear side 40 spaced up a considerable distance from the bottom 41 of the passageway 12. There is provided a bottom plate 42 at the bottom of the hopper which bottom plate extends the full width of the hopper, that is from one side 38 to the other side 38, but this bottom plate is spaced downward from the open bottom of the hopper and particularly from the lower extremity of the slanting rear side 40 of the hopper. This plate is horizontally arranged and is also spaced upwardly from the bottom 41 of the passageway 12 so that the water or the liquid being used not only passes below said plate but also passes above said plate in a generally horizontal direction, but with the flow induced by the constantly oncoming water up through outlet 11 and by the flow of water to the right or forwardly through the right hand portion of the passageway 12, the bottom of which portion has an appreciable slant more or less as shown in Fig. 2. Preferably this bottom plate 42 is capable of being adjusted not only horizontally but vertically thus allowing the operator of the machine to space it closer to the bottom of the hopper or further therefrom as the character of the vegetables being separated require and in order to get the desired quantity of feeding action from the hopper relative to the capacity of the machine or the plan of the operator. It will be seen that the water passing over the bottom plate 42 operates in a horizontal direction to carry the vegetables forwardly from below the hopper while the liquid passing below this plate forms a slowly and gently passing current of water or liquid with which the mixed vegetables and water or liquid from the hopper outlet mix as they pass to the right from the hopper.

The long dash line 43 in Fig. 2 indicates the approximate liquid level at the different parts of the machine. It will be noted that this level of the liquid to the rear or the left of the hopper 38 and through or across the lower part of the hopper itself is at a slightly higher level than is the top of the liquid to the right or to the front of the hopper and through the passageway 12. This is because the peas or other vegetables being sorted stay in the hopper and upon the bottom plate 42 or in the passageway long enough or with enough resistance to raise the water in the hopper and to the rear thereof and to some extent within the hopper even above the lower extremity of the rear slanting wall 40 of the hopper. This slightly higher level of the water or brine at this end of the machine operates to allow the liquid to penetrate into the hopper an appreciable distance above the bottom plate 42 and even above the lower extremity of the said slanting side 40 and appreciably above the bottom edge of the vertically adjustable gate 44 which is secured to the lower part of the front 39 of the hopper. This gate 44 is conveniently adjustably secured and held in desired position by a pair of winged nuts 45 engaging bolts 46 as particularly shown in Fig. 2. The means for vertically and horizontally adjusting and holding in adjusted position the bottom plate 42 conveniently consists of a spaced pair of rods 47 fastened to the bottom of said plate 42 and extending rearwardly of said plate and then appreciably on a slant to the rear upwardly to a point well above the water level at this place and there said rods have their threaded portions extending rearwardly through bushings 48 secured to the rear side 49 of the liquid supply tank 10 which side also extends upwardly above the water level to the rear of the hopper 38. Forward of the bushing 48 each rod 47 is supplied with a nut 50 forming an adjustable stop against the bushing 48. To the rear of the rear side 49 the rods are still screw-threaded and receive a nut 51 or winged nut whereby in an obvious manner this end of the rods are horizontally adjustable and removably secured in place. In practice the rods may be bent up or down by hand or with a proper tool enough to adjust the bottom plate 42 to its desired level. If necessary, however, the rods can be removed carrying therewith the plate 42 and then any decided adjustment can be made by bending the rods while the rods and the plate 42 are out of the machine. The advantage of bending the rods 47 upward so that their rear end is above the water level is so that the holes through the rear side 49 of the machine will be above the water level and so not given opportunity for the water or other liquid to leak from the machine at this point.

Ordinarily as seen in Fig. 2, the plate 42 is adjusted horizontally so that its front edge extends about two-thirds of the way from the lower end of the rear slanting side 40 of the hopper to the front wall 39 or more directly to the vertical gate 44. This allows the vegetables to be gently washed forward from the front end of the plate and from the hopper in front of the plate into the oncoming gentle current of water passing beneath the plate 42. As the vegetables are already mixed with water there is no sudden dropping of the vegetables for any distance into a separate or lower body of water but the mixture of water and vegetables above the plate 42 causes the vegetables to gently slide off of the plate and downwardly in the hopper in their surrounding water and move forwardly and downwardly into the combined current of water that is then passing beneath the lower edge of the vertical gate 44. This action is very important as it avoids any temporary diving or great dislocation of the vegetables at this point and allows the vegetables to begin at once to take their natural position in the current of water passing to the right through the passageway 12. It will be noted further that preferably the bottom plate after being adjusted horizontally forward to any working position to control the feed from the hopper extends a little to the rear of the bottom edge of the slanting rear side 40 of the hopper so as to insure that the vegetables passing downwardly near the slanting side of the hopper will go forward along and over the plate rather than have any opportunity to drop down past the rear edge of the plate 42. It will be particularly noted that the two rods 47 supporting the plate 42 are small enough so that they do not disturb the current of water going towards the hopper.

In the passageway 12 the current of liquid is slowly and gently moving towards the right or towards the front of the machine as this machine is constructed. Preferably there are provided in this passageway 12 a plurality of longitudinally extending partitions 52 which begin soon after the gate 44 is passed and extend for the full extent of the sloping bottom of this passageway until said sloping bottom meets the upper edge of the rear side 53 of the main separating tank 14. These partitions extend to a line slightly above the water level at this part of the machine and operate to prevent the occurrence of any side currents or eddies which would prevent the even and regular distribution of the vegetables in the current of liquid at this place. It will be understood that in most uses of this machine a very large proportion of separation of the lightest vegetables such as very young peas from the somewhat heavier vegetables such as the more mature peas which form the next class will take place in the space between the gate 44 and the rear end of the divider 19. In other words, during this distance the vegetables by reason of their weight relative to the water or the liquid being used sort themselves out into the lighter and usually better grade as light peas at or towards the top of the liquid while the vegetables of the heavier type and usually second grade are arriving at the bottom of the passageway 12 or at least approaching the bottom of the passageway 12 as they are moving towards the right. Accordingly by the time the vegetables reach the point or left end 54 of the divider 19 being the point where the slanting face 18 of said divider meets the rear slanting side 55, the vegetables as a whole are ready to be divided into their two classes and I have provided the divider to take advantage of and emphasize the division thus far made by allowing the lighter vegetables and their surrounding water to gently flow over the slightly upward slanting face 18 of the divider while the heavier vegetables and some water are directed more sharply downwardly between the lower side 55 of the divider and the slanting rear side 53 of the main tank.

Preferably this divider formed of top 18 and its slanting lower side 55 has its left end adjustable vertically so that the divider can be set with its said left end at different vertical positions as may be required to make the division between the two classes of vegetables. Conveniently this adjustment is made by having the righthand end of the top 18 of the divider adjustably supported upon the upper end of the first baffle 20ª. This is accomplished by having the extreme right end of the top 18 of the divider provided with a down-turned flange 18ª which when the divider is adjusted as shown in Fig. 2 is to the right of the baffle 20ª, and supports the divider in this position. The lower end of the slanting side 55 of the divider rests at all times in a pocket made by the lower end of the baffle 20ª having a flange 20ᵇ turned toward the left. Spaced to the rear from the flange 18ª the top 18 has at its lower side another downwardly facing shoulder 56 which may be at the left of the baffle 20ª as shown in Fig. 2 but which as shown in a detailed view, Fig. 3, may be positioned to the right of said baffle 20ª. This adjustment is made by temporarily raising the divider 19 until the shoulder 56 can be placed to the right of the first baffle 20ª. If desired as shown in said Fig. 4 one or more successive shoulders 57 can be provided still further to the left of the first shoulder 56. In practice, however, ordinarily two possible adjustments are sufficient to enable the machine to be adjusted to the division of material effected thus far in the machine.

The top member 18 of this divider at any ordinary adjustment thereof will slant slightly upwardly as it extends forwardly or to the right to its supporting baffle 20ª and thus tends to move slightly upwardly the vegetables that are above the horizontal line fixed by the left end 54 of the wedge-shaped divider 19. In a similar manner the vegetables that may be above the bottom of the right end of the passageway 12 but are still below the level of the thin end of the wedge, that is the left end 54, will be carried more or less towards the downwardly slanting rear side 55 of the divider, and so started more definitely towards the trough 15 provided for such heavy material. This wedge-shaped divider 19 it will be understood extends the full width of the main tank and operates to sharply divide the upper layer of the liquid carrying somewhere in its height the lighter class of vegetables from the lower layer of liquid and its contained relatively heavier vegetables. The advantage of having the rear or thin edge of this wedge-shaped divider vertically adjustable is that at different times the two classes of vegetables may be occupying a slightly different proportion of the total depth of the liquid at this point in the machine and the machine should be capable of being adjusted to accurately make this initial separation. It will be obvious that as the divider has its upper member or top 18 moved to the right or to the front of the machine the thin end of the wedge will be proportionately raised and thus the divider can be adjusted to make the desired separation.

The spaces between the different vertically arranged baffle plates 20 provide an opportunity for any heavy vegetable that has been accidentally carried along with the lighter vegetables at or near the top of the liquid in the main settling tank to start dropping downward through the mass of liquid in this tank. Similarly any light vegetable that may have been adhering to a heavier vegetable but becomes loosened therefrom after going part way down towards the trough 15 can rise through the liquid between the different baffle plates 20. These baffle plates do minimize any definite longitudinal current, that is, from left to right in the middle vertical zone of the main tank and so give more opportunity for these delayed classifications to take place. Preferably the second baffle plate has an extension 57 at its lower end extending forwardly, that is parallel with the back wall 53 of the main tank. This extension operates to extend further down into the tank the rather definite current of heavier vegetables and water passing down towards the trough. In a similar way the third baffle from the left which is located about in the lengthwise central portion of the tank has a forwardly slanting extension 58 at its lower end. This extension reduces the opening between its baffle and the forward side 59 of the tank and seems to aid in getting into the trough portion 15 any really heavy vegetables that have come down through the tank forward of the baffle carrying this extension 58. This extension 58 also operates to aid in the operation of the ejector-like pipe 60 which opens into the rear side of the trough 15 and directs a desired current of water horizontally from rear to front of this trough and which operates to form an upwardly moving current of water or liquid and of heavier vegetables through the tube 16 which slants upward from the forward end of the trough and carries the vegetables as already described to the upper end of the near portion $xx$ of the screen 17. It will be understood that the space between the lower end of the forward side 59 of the main tank and the upper portion of the tube 16 is provided with a closure 61 which, however, does not obstruct any part of the opening at the lower end of said tube 16.

At the front end of the main separating tank 14 and at the upper edge of the slanting front side 59 there is provided a substantially vertical wall 62. This wall affords an opportunity for placing at this point across the tank a vertically adjustable gate 63 the placing of the upper edge of which largely determines the level of the liquid in the main tank and the flow of the liquid from the top of the tank into the laterally slanting channel 21 carrying the lighter vegetables. From the top of the wall 62 there extends the channel 21 just referred to which reaches to the upper end of the further portion of the screen, that is the portion beyond the partition 23 which shows in Fig. 1. The parts of the machine are so constructed that any desired adjustment of the gate 63 brings its upper edge slightly above the floor of channel 21. It will be noted further that this gate 63 is used during normal operation of the machine. Just above the gate 63, however, there is placed a swinging stop gate 64. This gate may conveniently be a strip of wood or a strip of metal a few inches wide and extending the full width of the top of the tank at this place. The upper edge of this gate is pivoted at both ends of the gate to the adjacent side walls of the main tank as on pivot pins 65. During normal operation of the machine this swinging gate 64 is entirely above the water level at this part of the machine and the gate is held at this almost horizontal position as seen in Fig. 2 by reason of crank arms 66 extending from the upper edge of the gate towards the right as seen in Fig. 2 more than counter-balancing the weight of the gate proper. Conveniently there are two of these arms 66, one at each end of the gate, and these are provided with a short handle 67 so that the gate can be readily operated from either side of the machine. When in a normal operating position as seen in Fig. 2, the arms 66 rest upon the top of an ear 68 provided at each side of the tank. When a machine of this character is stopped the hesitating or undecided parts or units of vegetables tend to remain in the main tank an unduly long time, say several minutes before these hesitating pieces or units of vegetables slowly descend between the baffles into the trough 15. By providing this stop gate 64 and lowering it to the dotted line position as shown in Fig. 2 the current of liquid ordinarily passing to the right through this part of the machine and to the channel 21 is stopped by the lowering of this gate and thereupon the water still coming into the machine raises the level here slightly and thereby causes the current up through tube 16 to be proportionately increased and thus a downward current is caused between the baffles 20 which operates to move the hesitating particles or pieces of vegetables down through the space between said plates and into the trough 15. The water still supplied from the ejector-like pipe 60 causes a proportionately greater suction or current up through the tube 16 and thus empties the main tank of practically all of its contained vegetables. It will be understood of course that before the gate 64 is so dropped the feed of fresh vegetables from the hopper will be either exhausted or temporarily arrested. When the machine is to be placed in operation again the stop gate 64 will be raised from its dotted line position as shown in Fig. 2.

From the further side of the machine as seen in Fig. 2 and from near the bottom of the liquid-receiving tank 33 a suction pipe 69 extends to the intake port of pump 70 mounted at the farther side of the machine as seen in Fig. 2, but driven through a shaft 71 which extends beneath the machine to its forward side to a motor 72 on the near side of the machine as seen in Fig. 1. From the outlet port of this pump a pipe 73 extends upwardly to a point above the top of the main tank 14 which said pipe is connected to an elbow 74 the other end of which turns downwardly and is connected to a second vertically arranged pipe 75. Below the level of the bottom of the liquid supply tank 10 this pipe 75 is provided with a T-fixture 76 the sidewise projecting portion of which is connected to a horizontal pipe 77. This by suitable elbow 78 is connected to the pipe 35 already mentioned as connected to the bottom of the liquid supply tank 10. The water supply and connections thus mentioned provide the main supply of water for the liquid supply tank 10 and thereby for the large volume of water or liquid used to float the vegetables off from the plate 42 and into the passageway 12.

Below the T-fixture 76 there is provided another T-fixture 79 the angularly directed portion of which is connected to a section of pipe 80 which extends upward and has connected thereto a length of hose 81 the further end of which length of hose is by a suitable detachable joint generally denoted by the numeral 82, connected to fixtures and pipe 83 which ultimately are connected to the ejector-like pipe 60 already mentioned as entering the left or rear end of the trough 15 at the bottom of the main tank 14. It will thus be seen that the supply of water in pipe 75 also supplies this length of hose which in turn provides water to the trough 15 and so for the upwardly slanting tubing 16. The detachable joint denoted by numeral 82 for connecting one end of the hose to the pipe line 83 affords an easy method of disconnecting the water conduits at this part of the machine and so for cleaning out the water connections and particularly the lower part of the main tank 14 and its connected portions. Pipe 80 is provided with a control valve 94.

Preferably to the bottom of the T-fixture 79 there is provided another T-fitting 84 extending downwardly with its lower end closed as by plug 85, but having its angular arm connected to a horizontal length of pipe 86 which through elbow 87 is connected to an upright pipe 88. In the length of this pipe at a convenient place there is located a valve 89 controlled by the conventional valve wheel 90. Above this valve the pipe 88 continues to a point well above the top of the main tank and the passageway 12 and at its thus raised upper end said pipe is connected by suitable fittings to a horizontal length of pipe 91 which goes forwardly of the machine and is then connected to a downwardly extending length of pipe 92 which has its lower end enter the liquid-receiving tank 33.

When the valve 89 is opened it will be seen that its connected pipe length 86, 88, 91 and 92 form a by-pass connection for taking some of the water supplied by the pump to the pipe 75 back into the water-receiving tank without its entering either the main liquid supply tank or the ejector pipe 60. By closing this by-pass valve 89 all of the water supply to pipe 75 goes either to the liquid supply tank 10 or to the ejector pipe 60. This by-pass accordingly provides a convenient way of modifying the current and the quantity of water supplied to the inclined passageway 12 and to the ejector pipe 60 which controls the current up through tube 16.

The carrying of the water supply pipe 73 to a point as at return bend 74 above the water level in the main separating tank 14 and its connected water passages serve to prevent the water in the main liquid supply tank 10 from being drained off into the liquid supply tank 33 at any time when the machine is stopped. A small pipe 95 extends from the top of return bend 74 over to channel 21 and automatically breaks any siphoning of liquid supply tank 10 over into tank 33 whenever the machine is stopped.

A petcock 93 located in the upper part of the pipe 91 serves to break the siphoning action through pipe 91 when the machine is stopped and said petcock 93 is opened. The by-pass piping 88 is carried up to this top level 91 to prevent draining the supply tank 10 and main tank 14.

In the description of the operation of the machine so far given I have described the machine as being used as a grader to separate a relatively light class of vegetables such as peas from a relatively heavier class of vegetables such as more mature peas and in this grading operation of the machine the light vegetables follow the upper course through the machine, that is are still more positively deflected upwardly by the divider 19 and floated across the top of the main tank 14 and through delivery channel 21 out to the further large part of the screen 17 while the heavier vegetables follow the lower passageways through the machine that is beneath the rear side 55 of the divider down into the trough 15 at the bottom of the main tank and then up through the slanting tube 16. In such grading operation of the machine brine or its equivalent of desired strength is used to take advantage by the flotation system of the difference in specific gravity between different classes of vegetables of the same kind. This separating machine, however, can very advantageously be used as a cleaning machine in the sense of cleaning away from the vegetables relatively lighter material or trash such as thistles, skins, pods, leaves, sticks and weed seeds. When the machine is to be so used either plain water or in some cases a weak brine or the equivalent as liquid will be used. The trash or like material as above described will then follow the upper courses through the machine already described in detail as followed by the light vegetables while the vegetables themselves being cleaned will not be graded into classes, but will all follow the lower courses through the machine already described in detail as followed by the heavier vegetables when the machine is used as a grader and so all of the vegetables will go to the trough 15 and up through tube 16 and be delivered to the near side of the screen 17.

When this machine is operated as a grading machine the liquid controls of the machine are set to get more or less of an equal flow of liquid out of the two outlets of the machine, but when the machine is being used as a cleaning device the light weight trash requires only a very small proportion of liquid to float it across the top of the tank and over to the screen, but a very much greater quantity of water is required to carry the whole mass of vegetables first down into the lower part of the main tank and then up through the inclined tube 16. In general it may be stated that the amount of water used at the upper and lower passages through the machine varies very closely in proportion with the weight of the material being handled through those two separate sets of passages and of course the liquid controls will be adjusted accordingly.

A suitable baffle 96 is placed near the upper end of the screen 17 opposite the outlet from tube 16 and opposite the overflow from channel 21 to prevent the materials or liquid from being thrown too far at these points.

What I claim as new and desire to secure by Letters Patent is:

1. In a vegetable separator of the flotation-in-liquid type, the combination of a deep, main separating tank where the heavier vegetables sink and are taken from the bottom with some liquid through a lower outlet connected to an upwardly directed passage and where the lighter vegetables rise and float off through a top outlet at one side of said tank with the top liquid, means near the said outlet establishing the overflow level during normal operation of the machine and a movably mounted supplemental gate located near the said top outlet of said tank and adapted to be moved up above the liquid level during normal operation but adapted to be lowered and prevent escape of liquid at the said top outlet when the machine is to be stopped whereby the liquid level in said main tank is raised and a stronger current is induced in the said lower outlet for heavier vegetables.

2. In a vegetable separator of the flotation-in-liquid type, the combination of a deep main separating tank where the heavier vegetables sink and are taken from the bottom with some liquid through a lower outlet connected to an upwardly directed passage and where the lighter vegetables rise and float off through a top outlet at one side of said tank with the top liquid, vertically adjustable means near the said outlet establishing the overflow level during normal operation of the machine and a movably mounted supplemental gate located near the said top outlet of said tank and adapted to be moved up above the liquid level during normal operation but adapted to be lowered and prevent escape of liquid at the said top outlet when the machine is to be stopped whereby the liquid level in said main tank is raised and a stronger current is induced in the said lower outlet for heavier vegetables.

3. In a vegetable separator of the flotation-in-liquid type, the combination of a continuously downwardly inclined passageway for the gravity flow of a liquid with the vegetables therein, means for supplying the carrying and separating liquid near the upper end of said passageway in a gentle, continuous flow, an open-bottomed storage hopper for the relatively dry vegetables having its lower end projecting downwardly into said passageway downstream from the entering liquid and extending the full width of said passageway and having the lower edges of its transverse walls spaced up from the bottom of said passageway, a horizontally arranged bottom plate extending the width of the passageway below and spaced slightly down from the open bottom of the hopper and spaced a greater distance up from the bottom of the said passageway and forming a support at all times immersed in the liquid for the lower vegetables to rest upon, the lower part of the rear wall of the hopper projecting down into the stream of liquid in the passageway and forming a dam raising the level of liquid back of the hopper above the bottom of the hopper and over the said bottom plate, so that the vegetables successively resting on the said bottom plate are lubricated by the liquid and aided to move off from said plate and are gently flowed off from the plate and started downstream in the current of said liquid passageway, free of diving action, and the separation of the vegetables in the liquid is gently initiated and largely completed in said downwardly inclined passageway.

4. A vegetable separator having the construction defined in claim 3 and in which the said horizontally arranged bottom plate is vertically adjustable so that the relative amounts of liquid passing above and below said bottom plate may be varied.

5. A vegetable separator having the construction defined in claim 3 and in which said horizontally arranged bottom plate is wider than the width of the outlet of the hopper lengthwise of the said passage and extends from a line upstream from the upstream edge of the bottom of the hopper to a line partway towards the downstream edge of the outlet of the hopper so that the clear outlet of the hopper is reduced and is on the downstream side of said plate.

6. A vegetable separator having the construction defined in claim 3 and in which the downstream transverse wall of said hopper has along its lower edge a vertically adjustable gate so that the vertical outlet from the hopper may be varied.

7. A vegetable separator having the construction defined in claim 3 and in which the downstream transverse wall of said hopper has along its lower edge a vertically adjustable gate so that the vertical outlet from the hopper may be varied and in which also said horizontally arranged bottom plate is vertically adjustable so that the effective opening beyond the downstream extremity of the bottom plate for the escape of vegetables may be varied.

8. A vegetable separator having the construction defined in claim 3 and in which the said horizontally arranged bottom plate is horizontally adjustable so that the effective horizontal opening beyond the said plate for the escape of vegetables may be varied.

9. A vegetable separator having the construction defined in claim 3 and in which the downstream transverse wall of said hopper has along its lower edge a vertically adjustable gate so that the vertical outlet from the hopper may be varied and also in which said horizontally arranged bottom plate is adjustable both horizontally and vertically so that the combined clear opening between the opposing edges of said movable gate and said bottom plate may be varied in several ways.

GEORGE J. OLNEY